(12) United States Patent
Akl et al.

(10) Patent No.: US 11,589,288 B2
(45) Date of Patent: Feb. 21, 2023

(54) ROUTING AND BACKHAUL CHANNEL MANAGEMENT IN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Junyi Li, Franklin Park, NJ (US); Luca Blessent, Whitehouse Station, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 17/249,632

(22) Filed: Mar. 8, 2021

(65) Prior Publication Data

US 2021/0289421 A1 Sep. 16, 2021

Related U.S. Application Data

(60) Provisional application No. 62/989,393, filed on Mar. 13, 2020.

(51) Int. Cl.
*H04W 40/24* (2009.01)
*H04W 40/02* (2009.01)
*H04W 84/04* (2009.01)

(52) U.S. Cl.
CPC ........... *H04W 40/24* (2013.01); *H04W 40/02* (2013.01); *H04W 84/045* (2013.01)

(58) Field of Classification Search
None
See application file for complete search history.

(56) References Cited

U.S. PATENT DOCUMENTS

2020/0267795 A1* 8/2020 Jung ..................... H04W 36/16
2021/0045168 A1* 2/2021 Cho ...................... H04W 40/22
(Continued)

OTHER PUBLICATIONS

CATT: "Unified Design and QoS Handling for IAB", 3GPP TSG-RAN WG2 Meeting #1 03bis, 3GPP Draft; R2-1816885 IAB Design, 3rd Generation Partnership Project (3GPP), Mobile Competence Centre, 650, Route Des Lucioles, F-06921 Sophia-Antipolis Cedex, France, vol. RAN WG2, No. Spokane, USA; Nov. 12, 2018-Nov. 16, 2018, Nov. 2, 2018 (Nov. 2, 2018), pp. 1-5, XP051480825, Retrieved from the internet: URL: http://www.3gpp.org/ftp/tsg%5Fran/WG2%5FRL2/TSGR2%5F104/Docs/R2%2D1816885%2Ezip [retrieved on Nov. 2, 2018], The whole document.

(Continued)

*Primary Examiner* — Brian S Roberts
(74) *Attorney, Agent, or Firm* — Harrity & Harrity, LLP

(57) ABSTRACT

Various aspects of the present disclosure generally relate to wireless communication. In some aspects, a wireless node in a wireless multi-hop network may determine a change in multiplexing capability relating to communications on one or more radio link control (RLC) channels, and transmit information to a central unit that enables the central unit to cause modification of at least one of routing or RLC channel mapping in the wireless multi-hop network based at least in part on the change in multiplexing capability. Numerous other aspects are provided.

30 Claims, 9 Drawing Sheets

(56) References Cited

U.S. PATENT DOCUMENTS

2021/0051512 A1\* 2/2021 Hampel .............. H04W 28/0263
2022/0217613 A1\* 7/2022 Teyeb ..................... H04L 45/74

OTHER PUBLICATIONS

Huawei., et al., "IAB RLC Channel Management Procedure", 3GPP TSG-RAN WG2 meeting #105bis, 3GPP Draft; R2-1904985 IAB RLC Channel Management Procedure, 3rd Generation Partnership Project (3GPP), Mobile Competence Centre, 650, Route Des Lucioles, F-06921 Sophia-Antipolis Cedex, France, vol. RAN WG2, No. Xi'an, China; Apr. 8, 2019-Apr. 12, 2019, Mar. 29, 2019 (Mar. 29, 2019), pp. 1-4, XP051694173, Retrieved from the internet: URL: http://www.3gpp.org/ftp/tsg%5Fran/WG2%5FRL2/TSGR2%5F105bis/Docs/R2%2D1904985%2Ezip [retrieved on Mar. 29, 2019], The whole document.
International Search Report and Written Opinion—PCT/US2021/070253—ISA/EPO—dated Jun. 17, 2021.

\* cited by examiner

ROUTING AND BACKHAUL CHANNEL MANAGEMENT IN AN INTEGRATED ACCESS AND BACKHAUL NETWORK

CROSS-REFERENCE TO RELATED APPLICATION

This Patent Application claims priority to U.S. Provisional Patent Application No. 62/989,393, filed on Mar. 13, 2020, entitled "ROUTING AND BACKHAUL CHANNEL MANAGEMENT IN AN INTEGRATED ACCESS AND BACKHAUL NETWORK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for routing and backhaul channel management in an integrated access and backhaul (IAB) network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a wireless node in a wireless multi-hop network, may include determining a change in multiplexing capability relating to communications on one or more radio link control (RLC) channels, and transmitting information to a central unit that enables the central unit to cause modification of at least one of routing or RLC channel mapping in the wireless multi-hop network based at least in part on the change in multiplexing capability.

In some aspects, a method of wireless communication, performed by a central unit in a wireless multi-hop network, may include receiving information from a wireless node associated with a change in multiplexing capability relating to communications on one or more RLC channels, and transmitting, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability.

In some aspects, a wireless node in a wireless multi-hop network for wireless communication may include a memory and one or more processors operatively coupled to the memory. The memory and the one or more processors may be configured to determine a change in multiplexing capability relating to communications on one or more RLC channels, and transmit information to a central unit that enables the central unit to cause modification of at least one of routing or RLC channel mapping in the wireless multi-hop network based at least in part on the change in multiplexing capability.

In some aspects, a central unit in a wireless multi-hop network for wireless communication may include a memory and one or more processors operatively coupled to the memory. The memory and the one or more processors may be configured to receive information from a wireless node associated with a change in multiplexing capability relating to communications on one or more RLC channels, and transmit, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability.

In some aspects, a non-transitory computer-readable medium may store one or more instructions for wireless communication. The one or more instructions, when executed by one or more processors of a wireless node in a wireless multi-hop network, may cause the one or more processors to determine a change in multiplexing capability relating to communications on one or more RLC channels, and transmit information to a central unit that enables the central unit to cause modification of at least one of routing or RLC channel mapping in the wireless multi-hop network based at least in part on the change in multiplexing capability.

In some aspects, a non-transitory computer-readable medium may store one or more instructions for wireless communication. The one or more instructions, when executed by one or more processors of a central unit in a wireless multi-hop network, may cause the one or more processors to receive information from a wireless node associated with a change in multiplexing capability relating to communications on one or more RLC channels, and transmit, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability.

In some aspects, an apparatus in a wireless multi-hop network for wireless communication may include means for determining a change in multiplexing capability relating to communications on one or more RLC channels, and means for transmitting information to a central unit that enables the central unit to cause modification of at least one of routing or RLC channel mapping in the wireless multi-hop network based at least in part on the change in multiplexing capability.

In some aspects, an apparatus in a wireless multi-hop network for wireless communication may include means for receiving information from a wireless node associated with a change in multiplexing capability relating to communications on one or more RLC channels, and means for transmitting, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
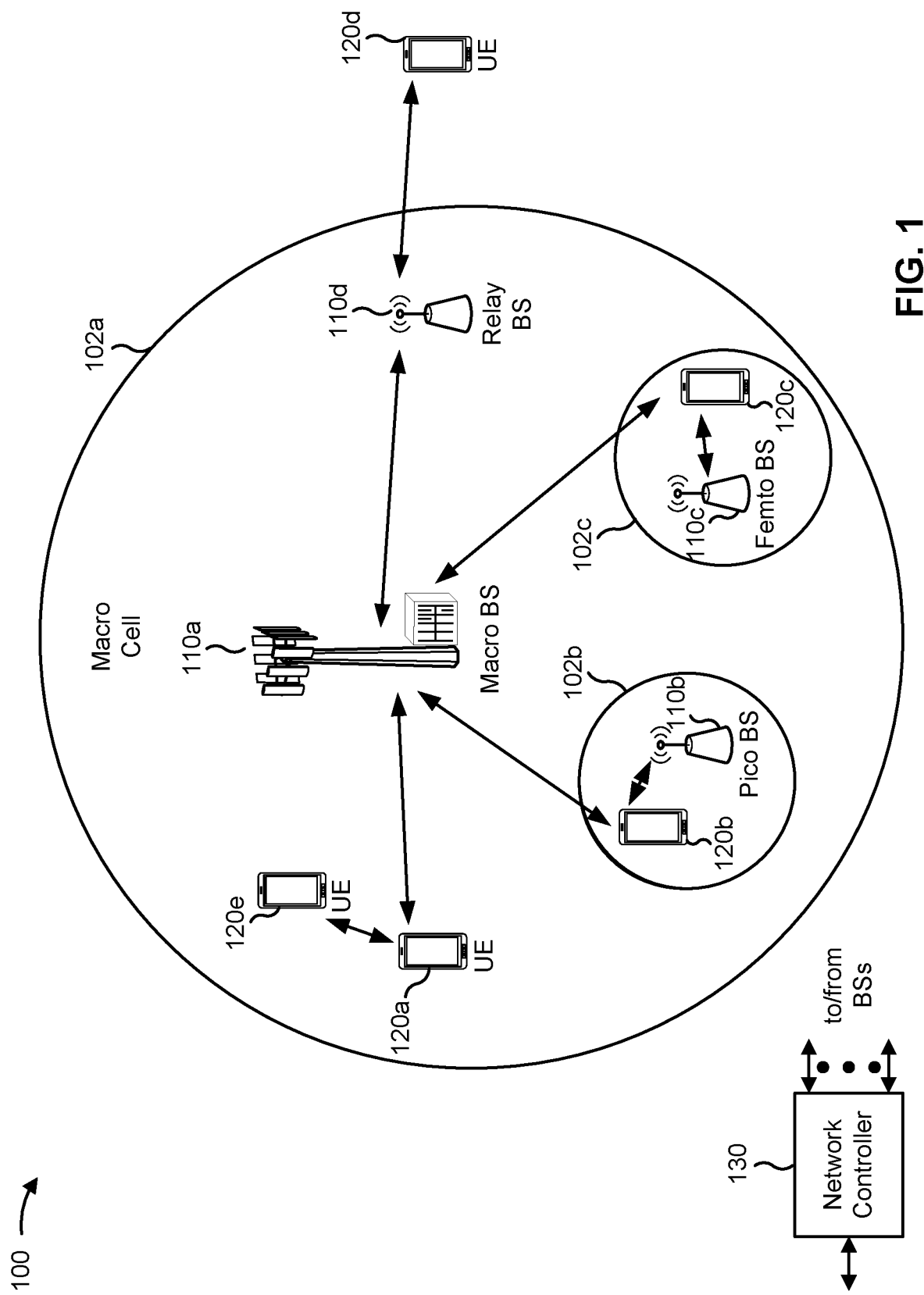
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
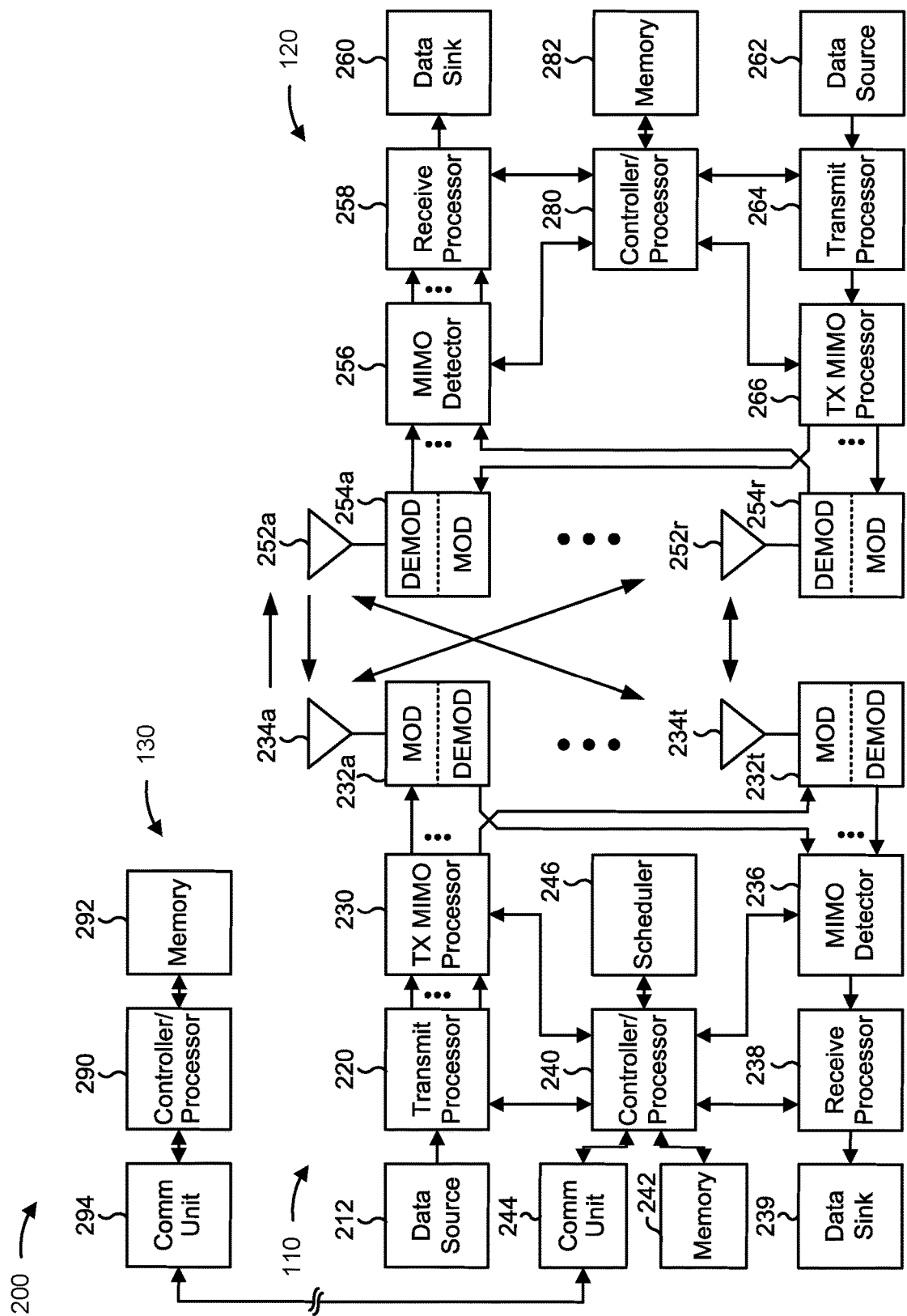
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8).

Controller/processor 240 of base station 110, controller/processor 280 of UE 120, and/or any other component(s) of FIG. 2 may perform one or more techniques associated with routing and backhaul channel management in an IAB network, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a wireless node (e.g., an IAB node, a base station 110, a UE 120, and/or the like) in a wireless multi-hop network may include means for determining a change in multiplexing capability relating to communications on one or more RLC channels, means for transmitting information to a central unit that enables the central unit to cause modification of at least one of routing or RLC channel mapping in the wireless multi-hop network based at least in part on the change in multiplexing capability, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a central unit (e.g., an IAB donor, a base station 110, and/or the like) in a wireless multi-hop network may include means for receiving information from a wireless node associated with a change in multiplexing capability relating to communications on one or more RLC channels, means for transmitting, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
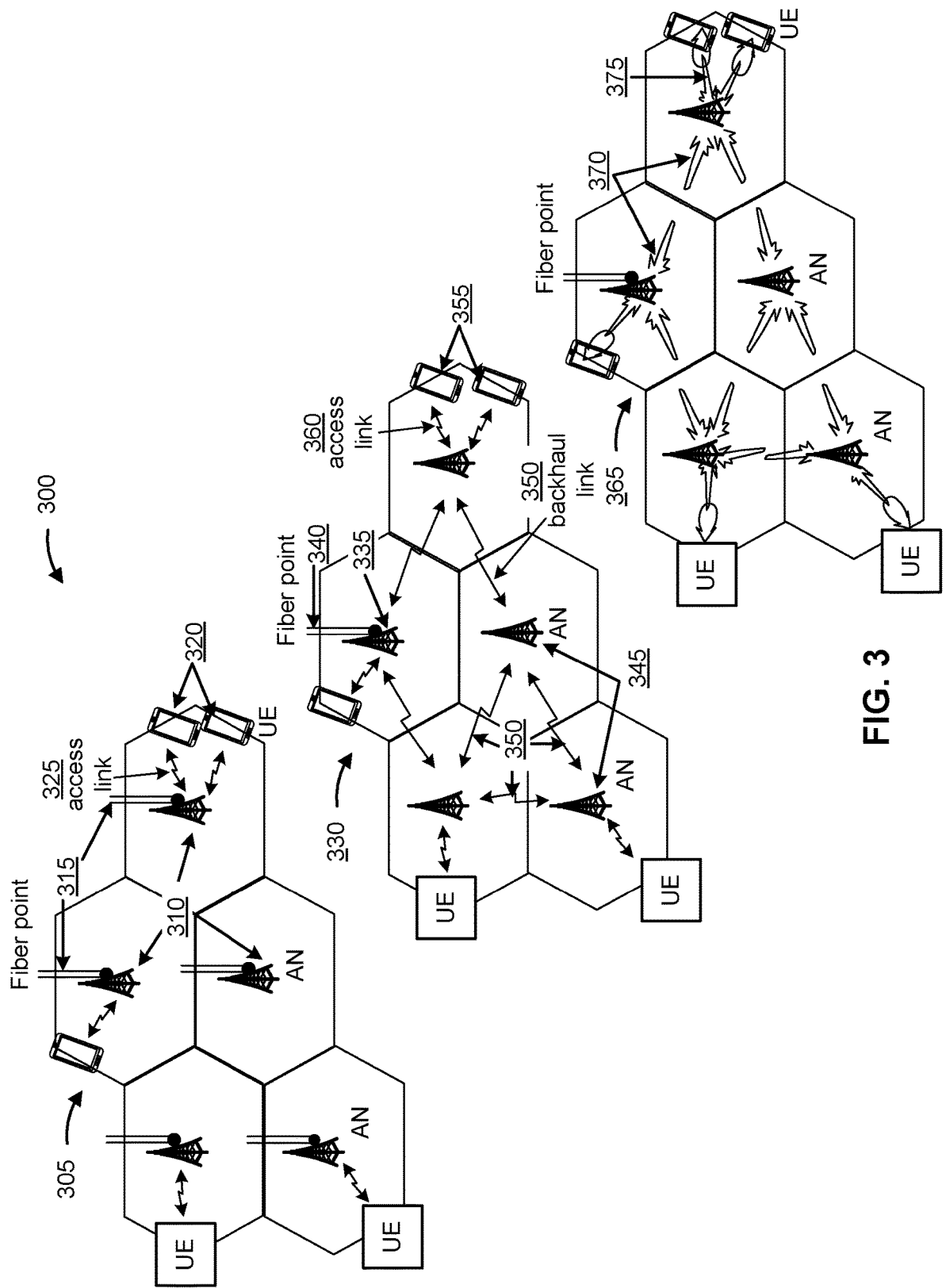
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an IAB network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
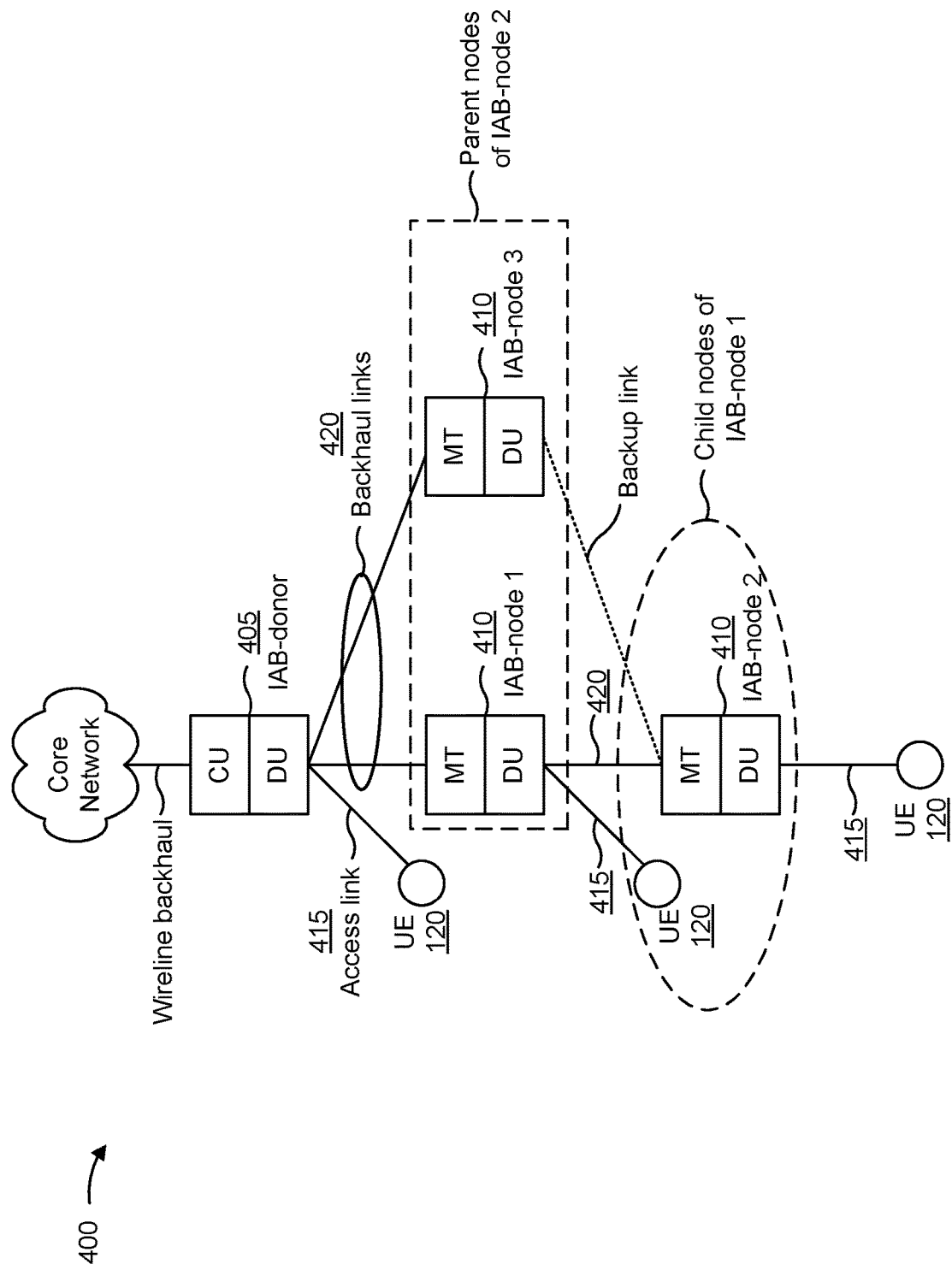
FIG. 4 is a diagram illustrating an example of an IAB network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (FLAP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, "node" or "wireless node" may refer to an IAB donor 405 or an IAB node 410.

An access link 415 may include one or more access radio link control (RLC) channels. An access RLC channel may carry packet data convergence protocol (PDCP) communications (e.g., radio resource control (RRC) communications, data radio bearer communications, and/or the like) from a UE 120, or an MT function of an IAB node 410, to a DU function of an IAB donor 405 or an IAB node 410.

A backhaul link 420 may include one or more backhaul RLC channels. A backhaul RLC channel may carry bandwidth allocation protocol (BAP) communications (e.g., for backhauling of access traffic) from an MT function of an IAB node 410 to a DU function of an IAB donor 405 or an IAB node 410 (e.g., respective backhaul RLC channels may be between hops on a route from an access IAB node 410 and a DU function of an IAB donor 405). Accordingly, a radio bearer for access traffic of a UE 120, or an MT function of an IAB node 410, may be mapped to a backhaul RLC channel, which may be an existing backhaul RLC channel or a backhaul RLC channel that was established for the radio bearer. As a result, different mappings between radio bearers and backhaul RLC channels may be possible. For example, a particular backhaul RLC channel may be mapped to a single radio bearer or multiple radio bearers, such as two radio bearers or three radio bearers. Moreover a parent node may not have information on a particular mapping between radio bearers and RLC channels used by a child node, and a child node may not have information on a particular mapping between radio bearers and RLC channels used by a parent node.

As indicated above, FIG. 4 is provided as an example. Other examples may differ from what is described with regard to FIG. 4.

Figure 5A:
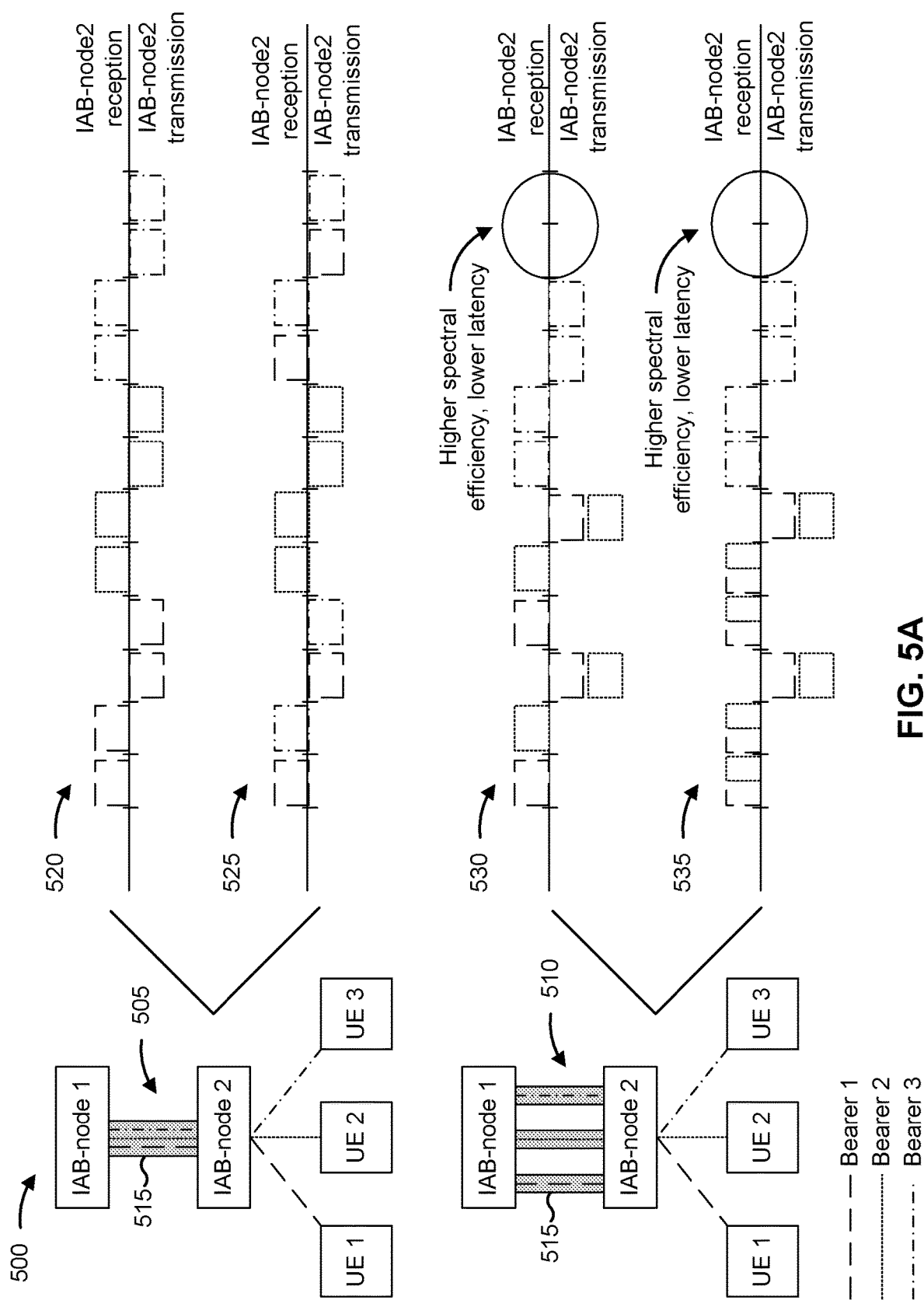
FIGS. 5A and 5B are diagrams illustrating examples of routing and backhaul channel management in an IAB network, in accordance with the present disclosure.

FIG. 5A is a diagram illustrating an example 500 of routing and backhaul channel management in an IAB network, in accordance with the present disclosure. As shown in FIG. 5A, and by network 505 and network 510, a first IAB node (shown as IAB-node 1) and a second IAB node (shown as IAB-node 2) may communicate on one or more backhaul RLC channels 515. The backhaul RLC channels 515 may be used for backhauling of access traffic of a first UE (shown as UE 1), a second UE (shown as UE 2), and a third UE (shown as UE 3).

Traffic for the first UE may be associated with a first radio bearer (shown as Bearer 1), traffic for the second UE may be associated with a second radio bearer (shown as Bearer 2), and traffic for the third UE may be associated with a third radio bearer (shown as Bearer 3). As shown in connection with network 505, the first, second, and third radio bearers may be mapped to an RLC channel 515 between the first and second IAB nodes. In other words, the mapping between the radio bearers and the RLC channel 515 may be 3:1. As shown in connection with network 510, the first radio bearer may be mapped to a first RLC channel 515 between the first and second IAB nodes, the second radio bearer may be mapped to a second RLC channel 515 between the first and second IAB nodes, and the third radio bearer may be mapped to a third RLC channel 515 between the first and second IAB nodes. In other words, the mapping between the radio bearers and the RLC channels 515 may be 1:1.

Traffic schedule 520 and traffic schedule 525 show examples of scheduling for the second IAB node, by the first IAB node, in network 505 that uses a 3:1 radio bearer to RLC channel 515 mapping (e.g., which is not optimized for a spatial division multiplexing (SDM) capability of the second IAB node). Schedules 520 and 525 show that, using a 3:1 radio bearer to RLC channel 515 mapping, the first IAB node may schedule transmissions from the second IAB node to the UEs to occur over two slots. For example, as shown by schedule 520, the second IAB node may be scheduled to receive, from the first IAB node, data for the first UE in a first and second slot, scheduled to transmit the data to the first UE in a third and fourth slot, scheduled to receive, from the first IAB node, data for the second UE in a fifth and sixth slot, scheduled to transmit the data to the second UE in a seventh and eighth slot, and so forth. Such scheduling may reduce spectral efficiency, increase latency, and/or the like.

Some techniques and apparatuses described herein enable modification of RLC channel mapping based at least in part on an SDM capability of a node, thereby increasing spectral efficiency, decreasing latency, and/or the like. Traffic schedule 530 and traffic schedule 535 show examples of scheduling for the second IAB node, by the first IAB node, in network 510 that uses a 1:1 radio bearer to RLC channel 515 mapping (e.g., which is optimized for an SDM capability of the second IAB node). Schedules 530 and 535 show that, using a 1:1 radio bearer to RLC channel 515 mapping when the second IAB node is capable of SDM for communications on the first RLC channel 515 (carrying traffic for the first UE) and the second RLC channel 515 (carrying traffic for the second UE), the first IAB node may schedule transmissions from the second IAB node to the first and second UEs to occur in one slot. For example, as shown by schedule 530, the second IAB node may be scheduled to receive, from the first IAB node, data for the first UE in a first slot and data for the second UE in a second slot, scheduled to transmit the data to the first UE and the second UE (e.g., in an SDM manner) in a third slot, and so forth.

As indicated above, FIG. 5A is provided as an example. Other examples may differ from what is described with regard to FIG. 5A.

Figure 5B:
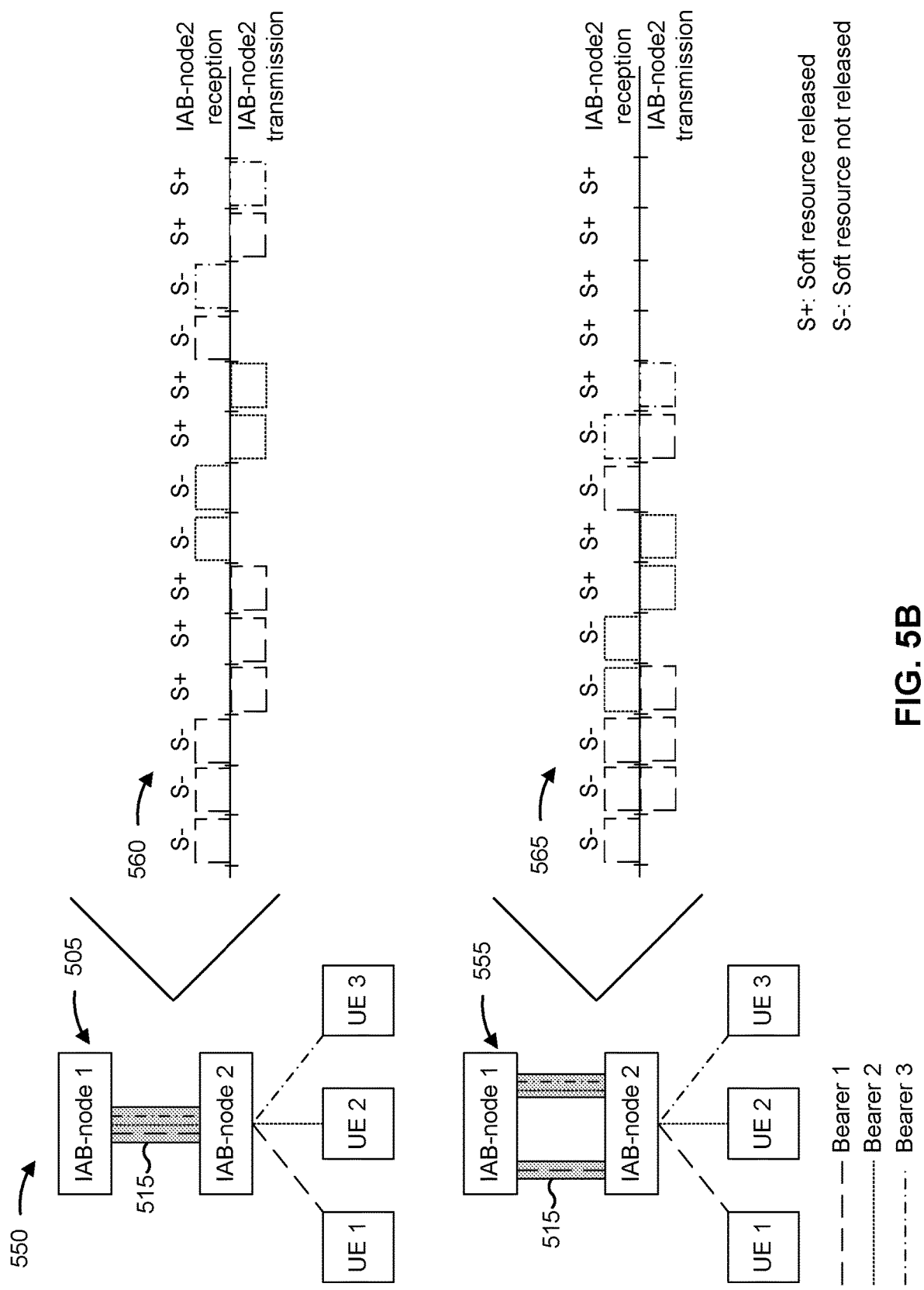

FIG. 5B is a diagram illustrating an example 550 of routing and backhaul channel management in an IAB network, in accordance with the present disclosure. FIG. 5B shows network 505, as described above. In addition, FIG. 5B shows network 555, in which the first IAB node and the second IAB node may communicate on multiple backhaul RLC channels 515, which may be used for backhauling of access traffic of the first UE, the second UE, and the third UE. As shown by network 555, the first radio bearer may be mapped to a first RLC channel 515 (e.g., a 1:1 mapping) between the first and second IAB nodes, and the second and third radio bearers may be mapped to a second RLC channel 515 (e.g., a 2:1 mapping) between the first and second IAB nodes.

Traffic schedule 560 shows an example of scheduling for the second IAB node, by the first IAB node, in network 505 that uses a 3:1 radio bearer to RLC channel 515 mapping (e.g., which is not optimized for a frequency duplexing (FD) capability of the second IAB node). Schedule 560 shows that, using a 3:1 radio bearer to RLC channel 515 mapping, the first IAB node may schedule reception and transmission of the second IAB node to occur in alternating slots (e.g., a reception and a transmission do not occur in the same slot). For example, as shown by schedule 560, the second IAB node may be scheduled to receive, from the first IAB node, data for the first UE in a first slot, a second slot, and a third slot, scheduled to transmit the data to the first UE in a fourth slot, a fifth slot, and a sixth slot, and so forth. Such scheduling may reduce spectral efficiency, increase latency, and/or the like.

Some techniques and apparatuses described herein enable modification of RLC channel mapping based at least in part on an FD capability of a node, thereby increasing spectral efficiency, decreasing latency, and/or the like. Traffic schedule 565 shows an example of scheduling for the second IAB node, by the first IAB node, in network 555 that uses a 1:1 mapping for the first radio bearer and the first RLC channel 515 (e.g., which is optimized for an FD capability of the second IAB node). Schedule 565 shows that, using a 1:1 mapping for the first radio bearer and the first RLC channel 515 when the second IAB node is capable of FD for communications on the first RLC channel 515 between the first and second IAB nodes (carrying traffic for the first UE), the first IAB node may schedule a reception and a transmission of the second IAB node to occur in the same slot. For example, as shown by schedule 565, the second IAB node may be scheduled to receive, from the first IAB node, data for the first UE in a first slot, scheduled to receive, from the first IAB node, data for the first UE in a second slot and transmit data for the first UE in the second slot (e.g., concurrently), scheduled to receive, from the first IAB node, data for the first UE in a third slot and transmit data for the first UE in the third slot (e.g., concurrently), and so forth.

Moreover, some techniques and apparatuses described herein enable modification of routing in a wireless multi-hop network based at least in part on an SDM and/or an FD capability of a node. For example, communications may be routed via a node that is capable of SDM and/or FD, thereby increasing spectral efficiency, decreasing latency, and/or the like. In some aspects, routing of communications via the node may be enabled by modification of RLC channel mapping, as described above.

As indicated above, FIG. 5B is provided as an example. Other examples may differ from what is described with regard to FIG. 5B.

Figure 6:
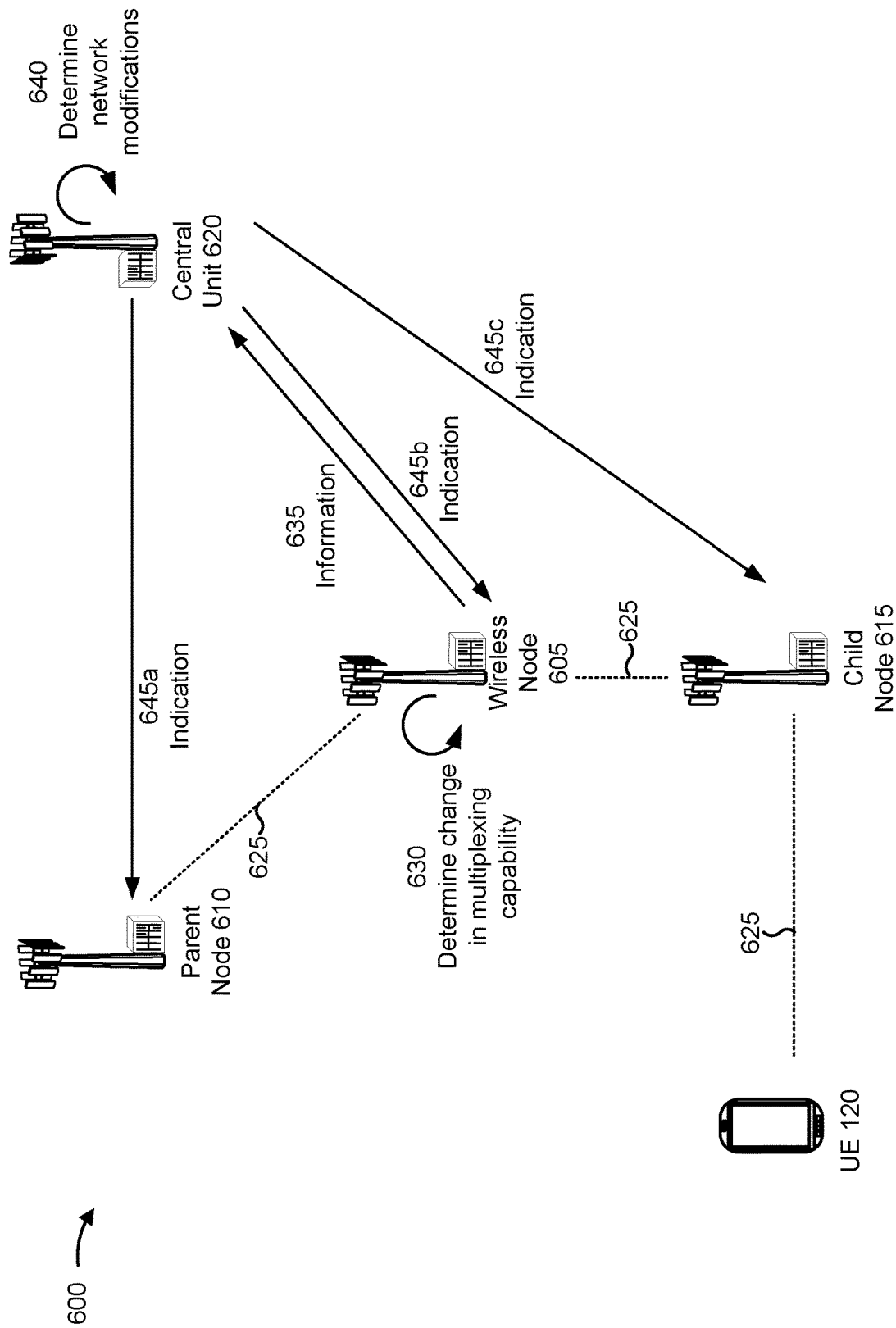
FIG. 6 is a diagram illustrating an example of routing and backhaul channel management in an IAB network, in accordance with the present disclosure.

FIG. 6 is a diagram illustrating an example 600 of routing and backhaul channel management in an IAB network, in accordance with the present disclosure. In particular, FIG. 6 shows communication between nodes of a wireless multi-hop network. For example, the wireless multi-hop network includes a wireless node 605, a parent node 610 (e.g., which schedules the wireless node 605), a child node 615 (e.g., which is scheduled by the wireless node 605), a UE 120 (e.g., which is served by the child node 615), and a central unit 620. In some aspects, the wireless multi-hop network is an IAB network, as described above. In this example, the wireless node 605, the parent node 610, and the child node 615 may be IAB nodes (e.g., IAB-nodes 410), and the central unit 620 may include a CU function of an IAB donor (e.g., IAB-donor 405).

In some aspects, the wireless multi-hop network may include additional and/or different nodes to those shown in FIG. 6. For example, the wireless node 605 may be associated with one or more additional parent nodes, one or more additional child nodes, may serve one or more additional UEs, and/or the like. In some aspects, the child node 615 may be a UE and/or the parent node 610 may be a DU function of an IAB donor.

As shown in FIG. 6, communications in the wireless multi-hop network may be carried on RLC channels 625. One or more backhaul RLC channels 625 between the wireless node 605 and the parent node 610 may carry backhaul traffic in connection with communications of the UE 120. One or more backhaul RLC channels 625 between the child node 615 and the wireless node 605 may carry backhaul traffic in connection with communications of the UE 120. One or more access RLC channels 625 between the UE 120 and child node 615 may carry communications of the UE 120.

As shown by reference number 630, the wireless node 605 may determine a change in multiplexing capability of the wireless node 605. The change in multiplexing capability may relate to an SDM capability and/or an FD capability. In SDM, the wireless node 605 may use multiple beams to concurrently transmit or receive communications with multiple child nodes (e.g., concurrently transmit to a first child node using a first beam and to a second child node using a second beam), or with a child node and the parent node 610 (e.g., concurrently receive from a child node using a first beam and from a parent node using a second beam). For example, the wireless node 605 may serve one or more UEs 120, and due to movement of the UEs 120 into a particular spatial arrangement, the wireless node 605 may determine that communications for one or more of the UEs 120 may use SDM. In FD, the wireless node 605 may concurrently transmit and receive communications with multiple child nodes (e.g., concurrently transmit to a first child node and receive from a second child node), or with a child node and the parent node 610 (e.g., concurrently transmit to a child node and receive from a parent node). The change in multiplexing capability may be a gain of the multiplexing capability or a loss of the multiplexing capability.

The change in multiplexing capability may relate to communications (e.g., traffic) of the wireless node 605 on one or more access links (e.g., with one or more child nodes, such as child node 615, one or more UEs 120, and/or the like) and/or a backhaul link (e.g., with child node 615, parent node 610, and/or the like). For example, the wireless node 605 may determine the change in multiplexing capability with respect to one or more RLC channels between the wireless node 605 and the parent node 610 (e.g., backhaul RLC channels and/or access RLC channels), one or more RLC channels between the wireless node 605 and the child node 615 (e.g., backhaul RLC channels and/or access RLC channels), and/or one or more RLC channels between the wireless node 605 and one or more UEs 120 (e.g., access RLC channels).

As shown by reference number 635, the wireless node 605 may transmit, and the central unit 620 may receive, information associated with a state of the wireless node 605. In some aspects, the wireless node 605 may transmit the information via an RRC message, an F1AP message, and/or the like. In some aspects, the wireless node 605 may transmit the information according to a configuration that provides a time interval for transmitting the information (e.g., the information is transmitted periodically according to the time interval) or a condition for transmitting the information (e.g., the information is transmitted upon a determination of a change in multiplexing capability). In some aspects, the central unit 620 may transmit the configuration to the wireless node 605 via an RRC message, an F1AP message, and/or the like. In some aspects, the central unit 620 may transmit a request to the wireless node 605 to transmit the information (e.g., a request to transmit an indication of multiplexing capability, transmit a rate at which the wireless node 605 is capable of communicating with one or more child nodes, and/or the like), and the wireless node 605 may transmit the information in response to the request.

In some aspects, the information may indicate that the wireless node 605 is associated with a multiplexing capability, or is not associated with a multiplexing capability, on one or more links of the wireless node 605. The information may indicate that the multiplexing capability relates to at least one of an SDM capability or an FD capability of the wireless node 605. The information may indicate that the multiplexing capability relates to communications, of the wireless node 605, with at least one of a single UE 120 (e.g., single user MIMO) or multiple UEs 120 (e.g., multiple user MIMO). The information may indicate that the multiplexing capability relates to at least one of a parent link or a child link of the wireless node 605. The information may indicate that the multiplexing capability relates to at least one of a transmission beam or a reception beam used by the wireless node 605. The information may indicate that the multiplexing capability relates to at least one of uplink communication or downlink communication of the wireless node 605.

In some aspects, the information may indicate that the multiplexing capability relates to one or more RLC channels 625. For example, the information may indicate one or more RLC channels (e.g., ingress RLC channels or egress RLC channels at the wireless node 605) on which communications may be multiplexed (e.g., if the change in multiplexing capability is a gain) or may no longer be multiplexed (e.g., if the change in multiplexing capability is a loss). As described above, a radio bearer associated with communications of a UE 120 may be mapped to an RLC channel. Accordingly, for example, if the wireless node 605 determines that communications for a first UE 120, associated with a first radio bearer, and a second UE 120, associated with a second radio bearer, may be multiplexed, the information may indicate the RLC channel(s) mapped to the first radio bearer and the second radio bearer. An RLC channel may be identified in the information by an RLC channel identifier, a logical channel identifier (LCID) that is mapped to the RLC channel, and/or the like. In some aspects, an RLC channel may be identified in the information by a pointer (e.g., an index value) that maps to the RLC channel.

In some aspects, the information may indicate a rate at which the wireless node 605 is capable of communicating with one or more child nodes served by the wireless node 605 (e.g., child node 615, one or more UEs 120, and/or the like). The rate may be used to schedule communications between the wireless node 605 (e.g., on a link with the wireless node 605 or on one or more RLC channels with the wireless node 605) such that the rates of incoming and outgoing traffic at the wireless node 605 correspond. The wireless node 605 may indicate the rate by indicating a particular MCS. Additionally, or alternatively, the wireless node 605 may indicate the rate by indicating one or more channel quality metrics (e.g., channel quality information) associated with the rate. The channel quality metrics may include a self-interference measurement for the wireless node 605.

The indicated rate may relate to a particular multiplexing mode of the wireless node 605. For example, the wireless node 605 may indicate a first rate at which the wireless node 605 is capable of communicating with a child node when communications for the child node are not to be multiplexed, a second rate at which the wireless node 605 is capable of communication with the child node when communications for the child node are to be multiplexed, and/or the like. In some aspects, the wireless node 605 may indicate a first rate at which the wireless node 605 is capable of communication with a child node when communications for the child node are to be multiplexed using SDM, a second rate at which the wireless node 605 is capable of communication with the child node when communications for the child node are to be multiplexed using FD, and/or the like.

As shown by reference number 640, the central unit 620 may determine one or more modifications for the wireless multi-hop network based at least in part on the information transmitted by the wireless node 605. In some aspects, the central unit 620 may determine that routing in the network is to be modified. For example, the central unit 620 may determine that traffic for a UE 120 is to be routed via the wireless node 605, or is not to be routed via the wireless node 605 (e.g., the traffic may be routed via another wireless node that is a child node of the parent node 610 and a parent node of the child node 615). The modification to routing in the network may be based at least in part on the change in multiplexing capability of the wireless node 605. For example, particular communications may be routed via the wireless node 605 if the wireless node 605 has gained a multiplexing capability, or particular communications may not be routed via the wireless node 605 if the wireless node 605 has lost a multiplexing capability.

In some aspects, the central unit 620 may determine that RLC channel mapping in the network is to be modified. For example, the central unit 620 may determine that a DU function of an IAB donor node, the wireless node 605, the parent node 610, and/or the child node 615 is to establish one or more RLC channels 625, remove one or more RLC channels 625, or modify a mapping of one or more RLC channels 625. The modification to RLC channel mapping in the network may be based at least in part on the change in multiplexing capability of the wireless node 605. For example, an RLC channel may have a 1:1 mapping with a radio bearer associated with a gain in multiplexing capability of the wireless node 605, to enable multiplexing of communications on the RLC channel at the wireless node 605.

As shown by reference numbers 645a, 645b, and 645c, the central unit 620 may transmit, and the wireless node 605, the parent node 610, and/or the child node 615 may receive, an indication to perform one or more actions that relate to modifying routing or RLC channel mapping in the wireless multi-hop network. That is, the central unit 620 may cause modification of routing or RLC channel mapping in the network by instructing the wireless node 605, the parent node 610 (e.g., an upstream node), and/or a child node (e.g., a downstream node) to perform one or more actions. In some aspects, the central unit 620 may transmit such an indication to a DU function of an IAB donor node. The indication may be included in a message, such as a BAP configuration message.

An action may be using a particular routing identifier for communications (e.g., protocol data units (PDUs)) on a particular RLC channel 625 (or another logical channel). For example, an ingress node, such as a DU function of an IAB donor node and/or an access node (e.g., child node 615, as shown), may use (e.g., insert) the routing identifier for PDUs to or from a particular UE 120. In such cases, the indication may identify the routing identifier that is to be used (e.g., for PDUs of a particular UE 120). In some aspects, the routing identifier may be a BAP routing identifier or a BAP path identifier.

An action may be updating a routing table (e.g., a BAP routing update). For example, one or more nodes (e.g., an intermediate-hop node, such as wireless node 605, parent node 610, and/or child node 615) may update a routing table so that communications (e.g., PDUs) on a particular ingress link and/or RLC channel 625 are routed on an updated egress link and/or RLC channel 625. That is, a routing table may be updated for forwarding of PDUs associated with the particular routing identifier being used. In some aspects, using a particular routing identifier and/or updating a routing table may be performed in connection with one or more actions relating to modification of RLC channels, as described below.

An action may be establishing one or more RLC channels 625 (e.g., on one or more backhaul links). For example, a parent node (e.g., the wireless node 605, the parent node 610, an IAB donor node, and/or the like) may establish one or more RLC channels 625 at a DU side of a backhaul link, and a child node (e.g., the wireless node 605, the parent node 610, the child node 615, and/or the like) may establish one or more corresponding RLC channels 625 at an MT side of the backhaul link. An action may be removing one or more RLC channels 625. For example, a parent node may remove one or more RLC channels 625 at a DU side of a backhaul link, and a child node may remove one or more corresponding RLC channels 625 at an MT side of the backhaul link. An action may be modifying a mapping of radio bearers to RLC channels 625. For example, a node may re-map one or more radio bearers to one or more RLC channels 625.

In such cases, the indication also may include a configuration for mapping radio bearers to RLC channels. For example, the configuration may indicate one or more radio bearers that are to be mapped to an RLC channel 625 that is established, one or more radio bearers that are to be re-mapped to one or more RLC channels 625 due to removal of an RLC channel 625, one or more radio bearers that are to be re-mapped to one or more extant RLC channels 625, and/or the like.

In some aspects, the indication may provide an association between the one or more actions and the change in multiplexing capability of the wireless node 605. For example, the indication may provide an association between the one or more actions and a gain, or a loss, of an SDM capability or an FD capability of the wireless node 605. In some aspects, a node (e.g., parent node 610, child node 615, and/or the like) may prioritize communications with the wireless node 605 based at least in part on the association. For example, the node may modify scheduling of the wireless node 605, modify selection of data from RLC channels 625 for transmission to the wireless node 605, modify soft resource management (e.g., releasing and/or reclaiming of soft resources), and/or the like. In this way, spectral efficiency and/or latency may be improved.

As an example, the parent node 610 may establish a backhaul RLC channel 625, associated with an FD capability, on a link with the wireless node 605, and determine that communications of the wireless node relating to the RLC channel 625 are to be scheduled so that the wireless node 605 receives and transmits concurrently (e.g., soft resources are not released to the wireless node 605). As another example, the parent node 610 may re-map radio bearers, associated with an SDM capability, that share an RLC channel 625 to separate RLC channels 625, and determine that communications of the wireless node relating to the separate RLC channels 625 are to be scheduled for SDM (e.g., a single slot is scheduled for the wireless node 605 to transmit communications for the separate RLC channels 625).

In some aspects, the central unit 620 may transmit, and a node (e.g., wireless node 605, parent node 610, child node 615, a DU of an IAB donor, and/or the like) may receive, a resource allocation that is based at least in part on the change in multiplexing capability of the wireless node 605. For example, the central unit 620 may transmit a resource allocation for one or more RLC channels 625 associated with the change in multiplexing capability. In some aspects, the resource allocation may allocate hard resources to the node. For example, the central unit 620 may allocate hard resources to the wireless node 605, the parent node 610, and the child node 615 when the wireless node 605 indicates an FD capability for communications on a link with the parent node 610 and a link with the child node 615.

As indicated above, FIG. 6 is provided as an example. Other examples may differ from what is described with respect to FIG. 6.

Figure 7:
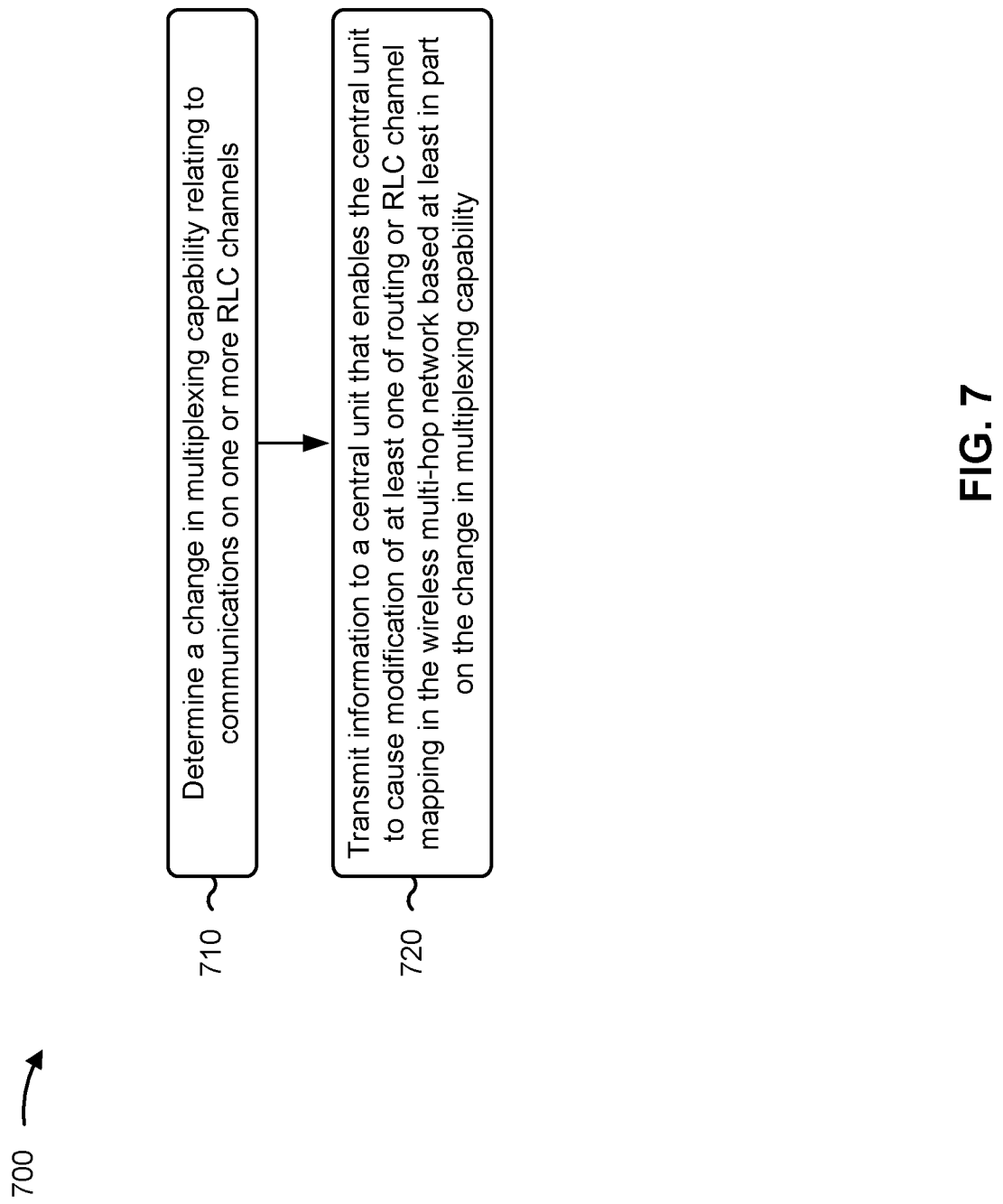
FIG. 7 is a diagram illustrating an example process performed, for example, by a wireless node in a wireless multi-hop network, in accordance with the present disclosure.

FIG. 7 is a diagram illustrating an example process 700 performed, for example, by a wireless node in a wireless multi-hop network, in accordance with the present disclosure. Example process 700 is an example where the wireless node (e.g., a base station 110, a UE 120, an IAB node 410, a wireless node 605, a parent node 610, a child node 615, and/or the like) performs operations associated with routing and backhaul channel management in an IAB network.

As shown in FIG. 7, in some aspects, process 700 may include determining a change in multiplexing capability relating to communications on one or more RLC channels (block 710). For example, the wireless node (e.g., using controller/processor 240, controller/processor 280, and/or the like) may determine a change in multiplexing capability relating to communications on one or more RLC channels, as described above.

As further shown in FIG. 7, in some aspects, process 700 may include transmitting information to a central unit that enables the central unit to cause modification of at least one of routing or RLC channel mapping in the wireless multi-hop network based at least in part on the change in multiplexing capability (block 720). For example, the wireless node (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit information to a central unit that enables the central unit to cause modification of at least one of routing or RLC channel mapping in the wireless multi-hop network based at least in part on the change in multiplexing capability, as described above.

Process 700 may include additional aspects, such as any single aspect or any combination of aspects described below and/or in connection with one or more other processes described elsewhere herein.

In a first aspect, the information indicates that the change in multiplexing capability is related to one or more of: at least one of a spatial division multiplexing capability or a full duplexing capability of the wireless node, communications with at least one of a single UE or multiple UEs, at least one of a parent link or a child link of the wireless node, at least one of a transmission beam or a reception beam used by the wireless node, at least one of uplink communication or downlink communication of the wireless node, or at least one of the one or more RLC channels.

In a second aspect, alone or in combination with the first aspect, the information is transmitted in response to a request by the central unit.

In a third aspect, alone or in combination with one or more of the first and second aspects, the information indicates a rate at which the wireless node is capable of communicating with one or more child nodes of the wireless node.

In a fourth aspect, alone or in combination with one or more of the first through third aspects, the rate relates to a particular multiplexing mode of the wireless node.

In a fifth aspect, alone or in combination with one or more of the first through fourth aspects, process 700 includes receiving, from the central unit, an indication to perform one or more actions to thereby modify the at least one of the routing or the RLC channel mapping.

In a sixth aspect, alone or in combination with one or more of the first through fifth aspects, the one or more actions include one or more of: establishing an RLC channel, removing an RLC channel of the one or more RLC channels, modifying a mapping for an RLC channel of the one or more RLC channels, using a particular routing identifier for communications on an RLC channel of the one or more RLC channels, or updating a routing table.

In a seventh aspect, alone or in combination with one or more of the first through sixth aspects, the central unit is to transmit, to a parent node of the wireless node, an indication to perform one or more actions to thereby modify the at least one of the routing or the RLC channel mapping.

In an eighth aspect, alone or in combination with one or more of the first through seventh aspects, the indication indicates an association between the one or more actions and the change in multiplexing capability.

In a ninth aspect, alone or in combination with one or more of the first through eighth aspects, process 700 includes receiving, from the central unit, a resource allocation that is based at least in part on the change in multiplexing capability.

In a tenth aspect, alone or in combination with one or more of the first through ninth aspects, the information is transmitted according to a configuration that provides a time interval for transmitting the information or a condition for transmitting the information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
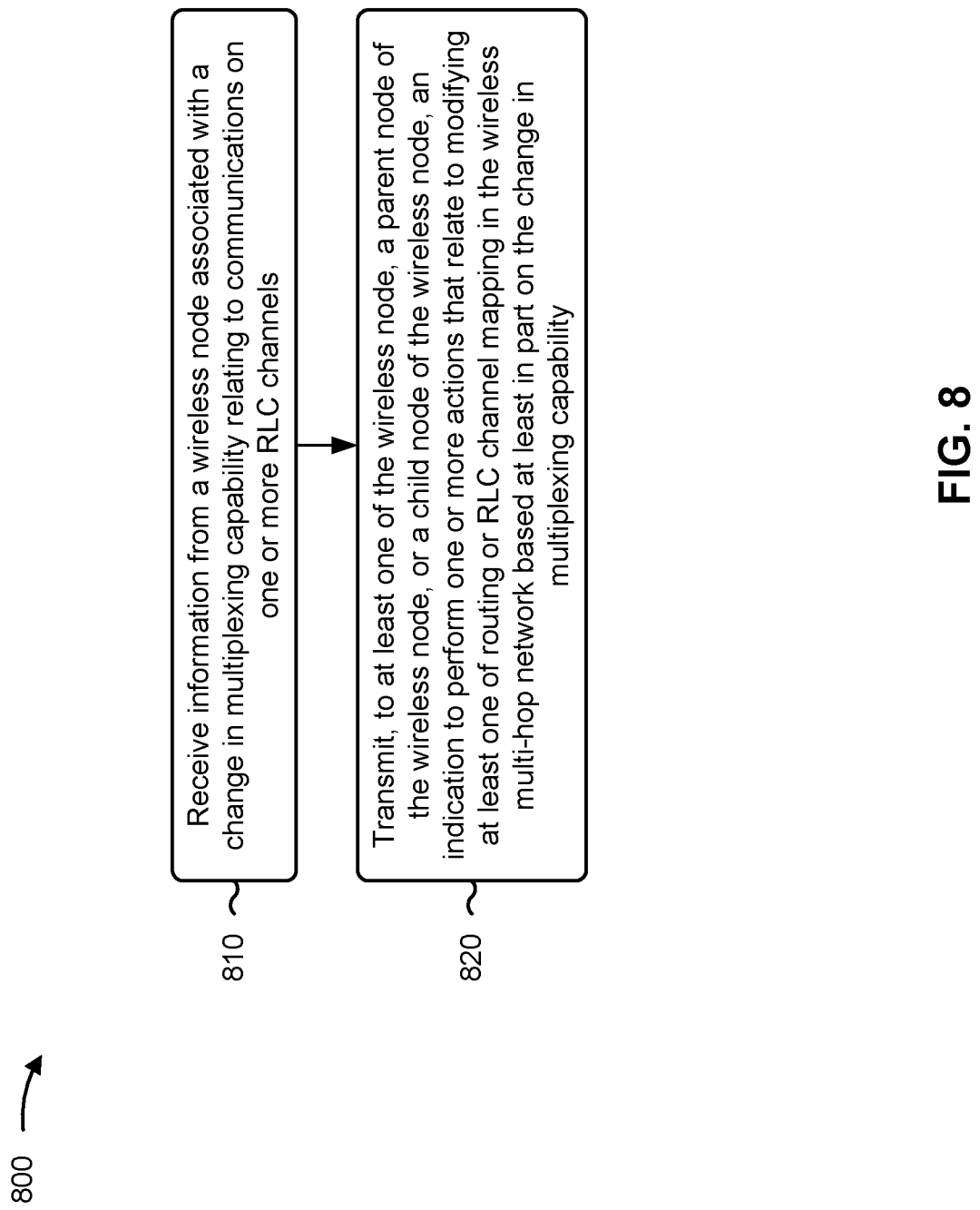
FIG. 8 is a diagram illustrating an example process performed, for example, by a central unit in a wireless multi-hop network, in accordance with the present disclosure.

FIG. 8 is a diagram illustrating an example process 800 performed, for example, by a central unit, in accordance with the present disclosure. Example process 800 is an example where the central unit (e.g., a base station 110, a CU of IAB donor 405, central unit 620, and/or the like) performs operations associated with routing and backhaul channel management in an IAB network.

As shown in FIG. 8, in some aspects, process 800 may include receiving information from a wireless node associated with a change in multiplexing capability relating to communications on one or more RLC channels (block 810). For example, the central unit (e.g., using antenna 234, DEMOD 232, MIMO detector 236, receive processor 238, controller/processor 240, and/or the like) may receive information from a wireless node associated with a change in multiplexing capability relating to communications on one or more RLC channels, as described above.

As further shown in FIG. 8, in some aspects, process 800 may include transmitting, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability (block 820). For example, the central unit (e.g., using transmit processor 220, TX MIMO processor 230, modulator 232, antenna 234, controller/processor 240, memory 242, scheduler 246, and/or the like) may transmit, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability, as described above.

Process 800 may include additional aspects, such as any single aspect or any combination of aspects described below and/or in connection with one or more other processes described elsewhere herein.

In a first aspect, the information indicates that the change in multiplexing capability is related to one or more of: at least one of a spatial division multiplexing capability or a full duplexing capability of the wireless node, communications with at least one of a single UE or multiple UEs, at least one of a parent link or a child link of the wireless node, at least one of a transmission beam or a reception beam used by the wireless node, at least one of uplink communication or downlink communication of the wireless node, or at least one of the one or more RLC channels.

In a second aspect, alone or in combination with the first aspect, process 800 includes transmitting a request to the wireless node to transmit the information.

In a third aspect, alone or in combination with one or more of the first and second aspects, the information indicates a rate at which the wireless node is capable of communicating with one or more child nodes of the wireless node.

In a fourth aspect, alone or in combination with one or more of the first through third aspects, the rate relates to a particular multiplexing mode of the wireless node.

In a fifth aspect, alone or in combination with one or more of the first through fourth aspects, process 800 includes causing modification of the at least one of routing or RLC channel mapping in the wireless multi-hop network based at least in part on the change in multiplexing capability.

In a sixth aspect, alone or in combination with one or more of the first through fifth aspects, the one or more actions include one or more of: establishing an RLC channel, removing an RLC channel, modifying a mapping for an RLC channel, using a particular routing identifier for communications on an RLC channel, or updating a routing table.

In a seventh aspect, alone or in combination with one or more of the first through sixth aspects, the indication indicates an association between the one or more actions and the change in multiplexing capability.

In an eighth aspect, alone or in combination with one or more of the first through seventh aspects, process 800 includes transmitting, to at least one of the wireless node, a parent node of the wireless node, or a child node of the wireless node, a resource allocation that is based at least in part on the change in multiplexing capability.

In a ninth aspect, alone or in combination with one or more of the first through eighth aspects, the information is received according to a configuration of the wireless node that provides a time interval for transmitting the information or a condition for transmitting the information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a wireless node in a wireless multi-hop network, comprising: determining a change in multiplexing capability relating to communications on one or more radio link control (RLC) channels; and transmitting information to a central unit that enables the central unit to cause modification of at least one of routing or RLC channel mapping in the wireless multi-hop network based at least in part on the change in multiplexing capability.

Aspect 2: The method of Aspect 1, wherein the information indicates that the change in multiplexing capability is related to one or more of: at least one of a spatial division multiplexing capability or a full duplexing capability of the wireless node, communications with at least one of a single user equipment (UE) or multiple UEs, at least one of a parent link or a child link of the wireless node, at least one of a transmission beam or a reception beam used by the wireless node, at least one of uplink communication or downlink communication of the wireless node, or at least one of the one or more RLC channels.

Aspect 3: The method of any of Aspects 1-2, wherein the information is transmitted in response to a request by the central unit.

Aspect 4: The method of any of Aspects 1-3, wherein the information indicates a rate at which the wireless node is capable of communicating with one or more child nodes of the wireless node.

Aspect 5: The method of Aspect 4, wherein the rate relates to a particular multiplexing mode of the wireless node.

Aspect 6: The method of any of Aspects 1-5, further comprising: receiving, from the central unit, an indication to perform one or more actions to thereby modify the at least one of the routing or the RLC channel mapping.

Aspect 7: The method of Aspect 6, wherein the one or more actions include one or more of: establishing an RLC channel, removing an RLC channel of the one or more RLC channels, modifying a mapping for an RLC channel of the one or more RLC channels, using a particular routing identifier for communications on an RLC channel of the one or more RLC channels, or updating a routing table.

Aspect 8: The method of any of Aspects 6-7, wherein the indication indicates an association between the one or more actions and the change in multiplexing capability.

Aspect 9: The method of any of Aspects 1-8, further comprising: receiving, from the central unit, a resource allocation that is based at least in part on the change in multiplexing capability.

Aspect 10: The method of any of Aspects 1-9, wherein the information is transmitted according to a configuration that provides a time interval for transmitting the information or a condition for transmitting the information.

Aspect 11: A method of wireless communication performed by a central unit in a wireless multi-hop network, comprising: receiving information from a wireless node associated with a change in multiplexing capability relating to communications on one or more radio link control (RLC) channels; and transmitting, to at least one of the wireless node, a parent node of the wireless node, or a child node of the wireless node, an indication to perform one or more actions that relate to modifying at least one of routing or RLC channel mapping in the wireless multi-hop network based at least in part on the change in multiplexing capability.

Aspect 12: The method of Aspect 11, wherein the information indicates that the change in multiplexing capability is related to one or more of: at least one of a spatial division multiplexing capability or a full duplexing capability of the wireless node, communications with at least one of a single user equipment (UE) or multiple UEs, at least one of a parent link or a child link of the wireless node, at least one of a transmission beam or a reception beam used by the wireless node, at least one of uplink communication or downlink communication of the wireless node, or at least one of the one or more RLC channels.

Aspect 13: The method of any of Aspects 11-12, further comprising: transmitting a request to the wireless node to transmit the information.

Aspect 14: The method of any of Aspects 11-13, wherein the information indicates a rate at which the wireless node is capable of communicating with one or more child nodes of the wireless node.

Aspect 15: The method of Aspect 14, wherein the rate relates to a particular multiplexing mode of the wireless node.

Aspect 16: The method of any of Aspects 11-15, further comprising: causing modification of the at least one of routing or RLC channel mapping in the wireless multi-hop network based at least in part on the change in multiplexing capability.

Aspect 17: The method of any of Aspects 11-16, wherein the one or more actions include one or more of: establishing an RLC channel, removing an RLC channel, modifying a mapping for an RLC channel, using a particular routing identifier for communications on an RLC channel, or updating a routing table.

Aspect 18: The method of any of Aspects 11-17, wherein the indication indicates an association between the one or more actions and the change in multiplexing capability.

Aspect 19: The method of any of Aspects 11-18, further comprising: transmitting, to at least one of the wireless node, a parent node of the wireless node, or a child node of the wireless node, a resource allocation that is based at least in part on the change in multiplexing capability.

Aspect 20: The method of any of Aspects 11-19, wherein the information is received according to a configuration of the wireless node that provides a time interval for transmitting the information or a condition for transmitting the information.

Aspect 21: An apparatus for wireless communication at a device, comprising a processor; memory coupled with the processor; and instructions stored in the memory and executable by the processor to cause the apparatus to perform the method of one or more Aspects of Aspects 1-10.

Aspect 22: A device for wireless communication, comprising a memory and one or more processors coupled to the memory, the memory and the one or more processors configured to perform the method of one or more Aspects of Aspects 1-10.

Aspect 23: An apparatus for wireless communication, comprising at least one means for performing the method of one or more Aspects of Aspects 1-10.

Aspect 24: A non-transitory computer-readable medium storing code for wireless communication, the code comprising instructions executable by a processor to perform the method of one or more Aspects of Aspects 1-10.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 26: An apparatus for wireless communication at a device, comprising a processor; memory coupled with the processor; and instructions stored in the memory and executable by the processor to cause the apparatus to perform the method of one or more Aspects of Aspects 11-20.

Aspect 27: A device for wireless communication, comprising a memory and one or more processors coupled to the memory, the memory and the one or more processors configured to perform the method of one or more Aspects of Aspects 11-20.

Aspect 28: An apparatus for wireless communication, comprising at least one means for performing the method of one or more Aspects of Aspects 11-20.

Aspect 29: A non-transitory computer-readable medium storing code for wireless communication, the code comprising instructions executable by a processor to perform the method of one or more Aspects of Aspects 11-20.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 11-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node in a wireless multi-hop network for wireless communication, comprising:
   a memory; and
   one or more processors, coupled to the memory, configured to:
      determine a change in a spatial division multiplexing capability or a full duplexing capability relating to communications on one or more radio link control (RLC) channels; and
      transmit information to a central unit that enables the central unit to cause modification of at least one of routing or RLC channel mapping in the wireless multi-hop network based at least in part on the change in the spatial division multiplexing capability or the full duplexing capability.

2. The wireless node of claim 1, wherein the information indicates that the change in the spatial division multiplexing capability or the full duplexing capability is related to one or more of:
   at least one of the spatial division multiplexing capability or the full duplexing capability of the wireless node,
   communications with at least one of a single user equipment (UE) or multiple UEs,
   at least one of a parent link or a child link of the wireless node,
   at least one of a transmission beam or a reception beam used by the wireless node,
   at least one of uplink communication or downlink communication of the wireless node, or
   at least one of the one or more RLC channels.

3. The wireless node of claim 1, wherein the information is transmitted in response to a request by the central unit.

4. The wireless node of claim 1, wherein the information indicates a rate at which the wireless node is capable of communicating with one or more child nodes of the wireless node.

5. The wireless node of claim 4, wherein the rate relates to a particular multiplexing mode of the wireless node.

6. The wireless node of claim 1, wherein the one or more processors are further configured to:
   receive, from the central unit, an indication to perform one or more actions to thereby modify the at least one of the routing or the RLC channel mapping.

7. The wireless node of claim 6, wherein the one or more actions include one or more of:
   establish an RLC channel, remove an RLC channel of the one or more RLC channels,
modify a mapping for an RLC channel of the one or more RLC channels,
use a particular routing identifier for communications on an RLC channel of the one or more RLC channels, or
update a routing table.

8. The wireless node of claim 6, wherein the indication indicates an association between the one or more actions and the change in the spatial division multiplexing capability or the full duplexing capability.

9. The wireless node of claim 1, wherein the one or more processors are further configured to:
receive, from the central unit, a resource allocation that is based at least in part on the change in the spatial division multiplexing capability or the full duplexing capability.

10. The wireless node of claim 1, wherein the information is transmitted according to a configuration that provides a time interval for transmitting the information or a condition for transmitting the information.

11. A central unit in a wireless multi-hop network for wireless communication, comprising:
a memory; and
one or more processors, coupled to the memory, configured to:
receive information from a wireless node associated with a change in a spatial division multiplexing capability or a full duplexing capability relating to communications on one or more radio link control (RLC) channels; and
transmit, to at least one of the wireless node, a parent node of the wireless node, or a child node of the wireless node, an indication to perform one or more actions that relate to modifying at least one of routing or RLC channel mapping in the wireless multi-hop network based at least in part on the change in the spatial division multiplexing capability or the full duplexing capability.

12. The central unit of claim 11, wherein the information indicates that the change in the spatial division multiplexing capability or the full duplexing capability is related to one or more of:
at least one of the spatial division multiplexing capability or full duplexing capability of the wireless node,
communications with at least one of a single user equipment (UE) or multiple UEs,
at least one of a parent link or a child link of the wireless node,
at least one of a transmission beam or a reception beam used by the wireless node,
at least one of uplink communication or downlink communication of the wireless node, or
at least one of the one or more RLC channels.

13. The central unit of claim 11, wherein the one or more processors are further configured to:
transmit a request to the wireless node to transmit the information.

14. The central unit of claim 11, wherein the information indicates a rate at which the wireless node is capable of communicating with one or more child nodes of the wireless node.

15. The central unit of claim 14, wherein the rate relates to a particular multiplexing mode of the wireless node.

16. The central unit of claim 11, wherein the one or more processors are further configured to:
cause modification of the at least one of routing or RLC channel mapping in the wireless multi-hop network based at least in part on the change in the spatial division multiplexing capability or the full duplexing capability.

17. The central unit of claim 11, wherein the one or more actions include one or more of:
establish an RLC channel,
remove an RLC channel,
modify a mapping for an RLC channel,
use a particular routing identifier for communications on an RLC channel, or
update a routing table.

18. The central unit of claim 11, wherein the indication indicates an association between the one or more actions and the change in the spatial division multiplexing capability or the full duplexing capability.

19. The central unit of claim 11, wherein the one or more processors are further configured to:
transmit, to at least one of the wireless node, a parent node of the wireless node, or a child node of the wireless node, a resource allocation that is based at least in part on the change in the spatial division multiplexing capability or the full duplexing capability.

20. The central unit of claim 11, wherein the information is received according to a configuration of the wireless node that provides a time interval for transmitting the information or a condition for transmitting the information.

21. A method of wireless communication performed by a wireless node in a wireless multi-hop network, comprising:
determining a change in a spatial division multiplexing capability or a full duplexing capability relating to communications on one or more radio link control (RLC) channels; and
transmitting information to a central unit that enables the central unit to cause modification of at least one of routing or RLC channel mapping in the wireless multi-hop network based at least in part on the change in the spatial division multiplexing capability or the full duplexing capability.

22. The method of claim 21, wherein the information indicates that the change in the spatial division multiplexing capability or the full duplexing capability is related to one or more of:
at least one of Hall the spatial division multiplexing capability or the full duplexing capability of the wireless node,
communications with at least one of a single user equipment (UE) or multiple UEs,
at least one of a parent link or a child link of the wireless node,
at least one of a transmission beam or a reception beam used by the wireless node,
at least one of uplink communication or downlink communication of the wireless node, or
at least one of the one or more RLC channels.

23. The method of claim 21, wherein the information indicates a rate at which the wireless node is capable of communicating with one or more child nodes of the wireless node.

24. The method of claim 21, further comprising:
receiving, from the central unit, an indication to perform one or more actions to thereby modify the at least one of the routing or the RLC channel mapping.

25. The method of claim 24, wherein the one or more actions include one or more of:
establishing an RLC channel,
removing an RLC channel of the one or more RLC channels, modifying a mapping for an RLC channel of the one or more RLC channels, using a particular routing identifier for communications on an RLC channel of the one or more RLC channels, or updating a routing table.

26. The method of claim 21, further comprising:

receiving, from the central unit, a resource allocation that is based at least in part on the change in multiplexing capability.

27. A method of wireless communication performed by a central unit in a wireless multi-hop network, comprising:

receiving information from a wireless node associated with a change in a spatial division multiplexing capability or a full duplexing capability relating to communications on one or more radio link control (RLC) channels; and transmitting, to at least one of the wireless node, a parent node of the wireless node, or a child node of the wireless node, an indication to perform one or more actions that relate to modifying at least one of routing or RLC channel mapping in the wireless multi-hop network based at least in part on the change in the spatial division multiplexing capability or the full duplexing capability.

28. The method of claim 27, wherein the information indicates that the change in the spatial division multiplexing capability or the full duplexing capability is related to one or more of:

at least one of a spatial division multiplexing capability or a full duplexing capability of the wireless node, communications with at least one of a single user equipment (UE) or multiple UEs, at least one of a parent link or a child link of the wireless node, at least one of a transmission beam or a reception beam used by the wireless node, at least one of uplink communication or downlink communication of the wireless node, or at least one of the one or more RLC channels.

29. The method of claim 27, wherein the information indicates a rate at which the wireless node is capable of communicating with one or more child nodes of the wireless node.

30. The method of claim 27, wherein the one or more actions include one or more of:

establishing an RLC channel, removing an RLC channel, modifying a mapping for an RLC channel, using a particular routing identifier for communications on an RLC channel, or updating a routing table.

\* \* \* \* \*